3,043,743
PROTECTING ARTICLES FROM ANIMALS WITH STREPTOMYCES DISTALLICUS EXTRACTS
Baron Richard Dana and William Henry Ray, Ashland, Ohio, assignors to Societa Farmaceutici Italia Farmitalia, Milan, Italy
No Drawing. Filed Sept. 1, 1960, Ser. No. 53,375
5 Claims. (Cl. 167—46)

This invention relates to the treatment of seeds and other edible or gnawable articles to make them unattractive to small animals such as birds and rodents.

The depredations of birds and rodents is a very important problem which results in huge economic losses annually. Crows, pigeons, and other birds raid freshly planted gardens and farms and eat seeds which are not missed until it is too late to reseed. Rats and mice living in granaries not only consume large quantities of grain, but also contaminate it. These gnawing rodents also attack feed and grain sacks, paper and cardboard containers and insulation in their efforts to get at food. Freshly planted seedlings in reforestation programs, nurseries, orchards, vineyards and the like are often attacked by rodents and other animals. Means of preventing these losses have, therefore, been sought for a long time.

The present invention is based upon our discovery that when small amounts of the antibiotic substances, produced by fermentation of *Streptomyces distallicus*, are applied to objects which might be attacked by small animals, the article becomes unattractive to them and they refrain from eating or gnawing it.

The antibiotic substances produced by fermentation of *Streptomyces distallicus* are: distamycin, distamycin A, distamycin B, distamycin C and distacin. Hereinafter we will call with the term "distamycins" the mixture of all the products obtained by the fermentation of *Streptomyces distallicus*. These antibiotic substances are produced by aerobic fermentation of an aqueous nutrient medium by the micro-organism *Streptomyces distallicus*. The micro-organism can be isolated from soil by conventional techniques which have been used to isolate other antibiotic producing species of Streptomyces. The micro-organism grows easily at 28°–30° C. on solid media. Under the microscope it shows rather long straight hyphae that are scarcely branched. The spores may be spherical or oval and have the following sizes: 0.8–1.5$\mu$ and 0.8–2.0$\mu$. The thickness of the hyphae is about 1–1.6$\mu$.

On yeast agar long and straight hyphae with whorls or short, straight sympodial hyphae appear. On potato agar, carrot agar and asparagine agar vegetative mycelium is formed which on one side has a color which, upon aging, varies from the color of honey to brown, while the other side varies from fairly brown to chestnut. The aerial mycelium is scarce in these cultures and has a powdery, satiny appearance and a grayish white color during the first days of growing and, subsequently, a slightly cream gray color; on asparagine agar it exhibits a faded violet-brown color.

On starch agar and Czapek agar the vegetative mycelium varies from colorless to the color of honey, the opposite side being yellow; on Czapek agar the aerial mycelium is grayish white, on starch agar it is slightly wine-pink, always powdery and satiny.

In meat broth and peptone-glucose the vegetative mycelium is abundant, almost completely submerged in form of flocks; on meat broth it grows also on the surface in form of a ring which is honey-colored on one side, while the other side has a yellow color. The aerial mycelium is absent. On gelatine abundant growth occurs, the vegetative mycelium being honey brown and the back yellowish brown; the aerial mycelium varies from grayish white to gray; a diffuse brown-black pigment is present. No pigmentation occurs on other substrata. The organism liquefies the gelatine to a great extent after 25 days and hydrolyzes starch to a considerable amount. The most suitable culture medium for good mycelium growth and corresponding higher antibiotic activity consists of carbohydrates, nitrogen containing substances and salts.

A lyophilized suspension of viable spores and mycelia of *S. distallicus* has been deposited with the Northern Regional Research Laboratories at Peoria, Illinois, under NRRL No. 2886. Cultures are also available at the Commonwealth Micrological Institution, Ferry Lane, Kew, Surrey, England, as culture IMI No. 72,676 and at the National Collection of Industrial Bacteria, Teddington, Middlesex, England, as culture NCIB No. 8936.

The cultivation of *Streptomyces distallicus* to produce the distamycins is by submerged fermentation of an aqueous nutrient medium over a period of about 100 to 120 hours at a pH of about 7.6 in the same manner that other antibiotics are produced by other micro-organisms, the elements of nutrition, rate of aeration, and stirring being essentially the same.

Fortunately, the "distamycins" need not be used in a high degree of purity in practicing the present invention; accordingly, crude material from the fermentation may be readily obtained and used. The bird and rodent repellent activity of the material is contained largely in the mycelium, and it may be extracted therefrom with various solvents or it may be used as such. The extractions is usually carried out by agitating the mycelium which has been separated from the mother liquor with successive fractions of solvent such as butyl alcohol or other lower aliphatic alcohols. The extracts are separated by centrifugation or filtration, washed with water and evaporated under vacuum to obtain an oily concentate from which a yellow or yellowish-brown precipitate may be recovered by treatment with petroleum ether and drying. Although the micro-organism *Streptomyces distallicus* produces a number of related substances having substantial antibiotic activity, these need not be separated from each other or removed from the crude material, since the crude material as well as the dried mycelium which are a relatively inexpensive form of the product are highly effective for the purpose of the present invention.

In order that the present specification may be complete, an example of the production of crude "distamycins" suitable for use in treating seeds and other articles to render them repellent to small animals will be given.

A spore suspension obtained upon washing a culture of *Streptomyces distallicus* is added to 3000 cc. of a sterile medium consisting of: two percent dextrose, two percent corn steep liquor extract, one percent calcium carbonate, 0.3 percent ammonium sulfate, and 0.3 percent sodium chloride. Fermentation is continued at 28° C. for forty hours at a stirring rate of 150–250 revolutions per minute and a rate of air flow of one to two liters per minute per liter of culture medium.

300 cc. of a suspension of the vegetative mycelium of this culture are used for inoculating 6000 cc. of a similar sterile culture medium. At this production stage, the culture is kept fermenting for 85 to 100 hours at a stirring rate of 350 to 450 revolutions per minute and a rate of air flow of 1 to 1.5 liters per minute per liter of culture medium.

Seventeen liters of culture obtained by submerged fermentation as above is filtered. The mycelium is agitated for one hour with 2.5 liters of butanol. This treatment is repeated twice.

The butanol extracts are combined, washed with water, concentrated to an oily consistency and treated with petroleum. A yellow-brown product, "distamycins," is obtained.

To illustrate the repelling action of "distamycins" when applied to whole grain milo to mature pigeons, quantities of the grain were treated with "distamycins" to provide feed containing both 0.5 percent of crude "distamycins" and two percent crude "distamycins." The antibiotic was applied to the feed with the aid of an adhesive. The milo was placed in a Hobart mixer and while the agitator was operating approximately 5 percent by weight of a liquid latex preparation sold under the name Dow Latex 512R based on the weight of the whole grain was poured over the milo. When the mixture was uniform and the latex commenced to become tacky, the finely divided "distamycins" were added and the mixing continued for a while. The coated grain was removed from the mixer, spread out and dried.

Ten mature pigeons, two birds per pen, were used in the test, and each pen was provided with a jar containing 150 grams of the treated feed. The birds were allowed to self-feed ad libitum. Fresh water was supplied daily.

Three pens offered whole grain milo treated with 0.5 percent "distamycins" ate an average of only 0.5 gram of feed per bird per day over a three day period. Two pens provided with whole grain milo carrying two percent "distamycins" consumed an average of only 0.3 gram per bird per day. These same birds, when offered untreated whole grain milo, consumed an average of 31.1 grams of feed per bird per day.

In another test five pens of two pigeons each were offered a diet comprising a mixture of one part by weight of the 0.5 percent "distamycins" treated feed described above and four parts by weight of untreated whole grain milo. The tests were conducted as described above. It was found that the birds consumed an average of only 4.6 grams of feed containing 0.1 gram of "distamycins" per bird per day over a three day period as against 31.1 grams per bird per day consumption of untreated whole grain milo.

This experiment shows that amounts of "distamycins" as low as 0.1 percent by weight are effective as a repellent and that all of the grain particles in the mixture need not be treated in order for the repellent to be effective.

In another experiment was determined the repelling action of a dried mycelium of Streptomyces distallicus. The dried mycelium was obtained by filtering the fermentation broth of Streptomyces distallicus and drying it in vacuum at 60° C. In the mycelium so obtained the content of "distamycins" was 3.4 percent using as standard the same crude material obtained as hereinbefore described and used in the experiments above. The feed was prepared as follows: 588 grams of milo were placed in a wide mouthed jar of approximately 3 times capacity. Twelve grams of dried mycelium were placed on top of the milo, the lid screwed in place and the mixture vigorously shaken and rotated by hand for approximately two minutes; adherence of the material to the milo was uniform and practically complete without using any adhesive. Two pens of two pigeons each were offered whole grain milo treated with two percent dried mycelium of Streptomyces distallicus containing 3.4 percent of "distamycins" as described above. The tests were conducted in the same way as described above. It was found that the birds consumed an average of only 6.52 grams of feed containing 0.068 percent of "distamycins" per bird per day over a three day period as against 30.35 grams per bird per day consumption of untreated whole grain milo.

This experiment shows that the dried mycelium of S. distallicus is effective as a repellent even at a concentration of "distamycins" as low as 0.068 percent.

In still other tests the repellent action of "distamycins" against rats was determined. Mature, healthy white rats kept in individual cages for the duration of the experiment were used. The rats were weighed at the beginning and end of the test. Rockland Standard Rat Ration was used as the basic feed. It was ground in a coffee grinder after which 199 grams of the ground feed was placed in a 500 cc. beaker and one gram of "distamycins" was added. This was mixed thoroughly and then placed in a 500 cc. bottle and shaken for three minutes. This mixture was used as the treated ration. Two standard rat feeding bowls were placed in each cage. Twenty grams of treated feed were placed in one of the feed bowls, and twenty grams of untreated feed were placed in the other. These forty grams of feed constituted the only feed available to the rats during a four day feeding period. Daily feed consumptions were determined. Once each day the bowls were reversed in position within the cages in order to eliminate a possible position effect. 100 cc. of water, supplied in clean jars which were washed and replenished daily, was provided for each cage.

The effectiveness of "distamycins" as a repellent was determined by the method described in the article, "Rodent Control—A Review of Chemical Repellents for Rats," by Jack F. Welch, Fish and Wildlife Service, U.S. Dept. of the Interior, Denver, Colorado; Agricultural and Food Chemistry, vol. 2, page 142, February 3, 1954. The "K value" which is a measure of the effectiveness of "distamycins" as a repellent was determined by the formula $$K = 100 \frac{1}{100W} \times (8T_1 + 4T_2 + 2T_3 + T_4) \times (U_1 + U_2 + 2U_3 + 4U_4 + 8X)$$

wherein

K is the repellent index,
W is the body weight of the rat in kilograms,
T is the consumption of feed for each day of the test, the subscripts 1, 2, 3 and 4 indicate the day of the test,
U represents the consumption of untreated feed on the respective days of the test as indicated by the subscripts, and
X is the weight of untreated feed remaining at the end of the fourth day.

Repellents having a "K value" of 85 or higher as calculated by the above formula when applied to feed at two percent levels are considered to be worthy of further testing. As a result of the tests described above, "distamycins" at a level of only 0.5 percent had an average "K value" of 88.48 thus indicating that it was a highly effective rodent repellent.

As will be apparent from the foregoing, "distamycins" in amounts as low as 0.1 percent by weight or less may be used to repel the attacks of small animals when applied to or adjacent to articles sought to be protected. The term "small animal" as used herein includes birds, rodents and other animals which cause damage of the type hereinabove described. The "distamycins" are effective when applied to anything which these animals might otherwise wish to eat or gnaw upon. The articles may be treated with "distamycins" by simply mixing the antibiotic mixture with the article when the latter is finely divided. Preferably the article should be treated with an adhesive substance to insure that the "distamycins" will stick to it and not separate. Various adhesives may be used. The choice will depend upon the cost of the material and the nature of the article to which the "distamycins" are applied.

If desired the "distamycins" may be suspended in a liquid which may also contain an adhesive substance or have an adhesive character of its own and applied to the article by spraying or other suitable means.

In the case of the use of dried mycelium of *Streptomyces distallicus* no adhesive is needed when applied to seeds.

Although the invention is illustrated by showing the repellent action of "distamycins" on treated seeds or in feed, it should be understood that seeds or feed are the preferred diet of the animals tested, and "distamycins" would be equally effective or more so when applied to other less palatable objects.

We claim:

1. A method of treating seeds to render them unattractive to birds and rodents which comprises mixing dried mycelia of *Streptomyces distallicus* with said seeds.

2. A method of protecting articles against attacks by animals which comprises treating said articles with the antibiotic substances produced by the micro-organism *Streptomyces distallicus*.

3. The method of claim 2, the anmials being birds and rodents.

4. A method of protecting edible articles from attacks by birds and rodents which comprises applying to said articles the antibiotic substances produced by the micro-organism *Streptomyces distallicus*.

5. A method of treating seeds to make them unattractive to birds and rodents which comprises applying to said seeds at least 0.05% by weight of distamycins produced by the micro-organism *Streptomyces distallicus*.

References Cited in the file of this patent

Chemical Abstracts, vol. 53, page 20682e, 1959.